US00RE49402E

(19) United States
(12) Reissued Patent
Lee et al.

(10) Patent Number: US RE49,402 E
(45) Date of Reissued Patent: *Jan. 31, 2023

(54) DISPLAY DEVICE

(71) Applicant: LG DISPLAY CO., LTD., Seoul (KR)

(72) Inventors: Sun Jung Lee, Seoul (KR); In Hyuk Song, Goyang-si (KR); Heesun Shin, Paju-si (KR)

(73) Assignee: LG Display Co., Ltd., Seoul (KR)

( * ) Notice: This patent is subject to a terminal disclaimer.

(21) Appl. No.: 16/742,692

(22) Filed: Jan. 14, 2020

Related U.S. Patent Documents

Reissue of:
(64) Patent No.: 9,098,134
Issued: Aug. 4, 2015
Appl. No.: 13/727,271
Filed: Dec. 26, 2012

U.S. Applications:
(63) Continuation of application No. 15/662,126, filed on Jul. 27, 2017, now Pat. No. Re. 47,839, which is an application for the reissue of Pat. No. 9,098,134.

(30) Foreign Application Priority Data

Mar. 29, 2012 (KR) ..... 10-2012-0032333

(51) Int. Cl.
*G02F 1/1335* (2006.01)
*G02F 1/1345* (2006.01)
(Continued)

(52) U.S. Cl.
CPC ..... *G02F 1/13338* (2013.01); *G06F 3/041* (2013.01); *G06F 3/0412* (2013.01);
(Continued)

(58) Field of Classification Search
CPC ..... G06F 3/041; G06F 3/044; G06F 3/0412; G02F 1/1338
See application file for complete search history.

(56) References Cited

U.S. PATENT DOCUMENTS 5,825,449 A 10/1998 Shin
8,031,275 B2 10/2011 Lee
(Continued)

FOREIGN PATENT DOCUMENTS

CN 101681221 A 3/2010
CN 102109722 A 6/2011
(Continued)

OTHER PUBLICATIONS

Office Action dated Apr. 29, 2015, issued in counterpart Chinese Patent Application No. 201210524133.X.

*Primary Examiner* — Carlos N Lopez
(74) *Attorney, Agent, or Firm* — Morgan, Lewis & Bockius LLP

(57) ABSTRACT

An LCD device includes a plurality of gate lines and data lines cross-arranged on a lower substrate to define a plurality of pixels, a pixel electrode disposed in each of the pixels, a plurality of common electrode blocks pattern-formed that generate an electric field with the pixel electrode and sensing a touch of a user, a plurality of sensing lines, a plurality of pad parts arranged to be separated from each other at predetermined intervals along a corresponding sensing line, and having a line width thicker than the sensing line, and a contact part disposed between a corresponding pad part and a corresponding common electrode block, and electrically connecting a corresponding sensing line and the common electrode block. When the sensing lines are electrically connected to one of the common electrode blocks, the sensing lines are electrically insulated from the other common electrode blocks.

16 Claims, 11 Drawing Sheets

(51) Int. Cl.

| | |
|---|---|
| ***G06F 3/041*** | (2006.01) |
| ***G02F 1/1333*** | (2006.01) |
| ***G06F 3/044*** | (2006.01) |
| *G02F 1/1362* | (2006.01) |
| *G02F 1/1343* | (2006.01) |

(52) U.S. Cl.
CPC ..... *G06F 3/0443* (2019.05); *G06F 3/04164* (2019.05); *G02F 1/134372* (2021.01); *G02F 1/136286* (2013.01); *G06F 2203/04103* (2013.01)

(56) References Cited

U.S. PATENT DOCUMENTS

| | | | | |
|---|---|---|---|---|
| 8,659,710 | B2 | 2/2014 | Shin et al. | |
| RE47,839 | E * | 2/2020 | Lee | G06F 3/04164 |
| 2010/0182273 | A1 | 7/2010 | Noguchi et al. | |
| 2011/0157039 | A1 | 6/2011 | Shin et al. | |
| 2012/0133858 | A1* | 5/2012 | Shin et al. | 349/59 |
| 2013/0162570 | A1* | 6/2013 | Shin et al. | 345/173 |

FOREIGN PATENT DOCUMENTS

| | | | |
|---|---|---|---|
| KR | 10-2007-0082757 | A | 8/2007 |
| KR | 10-2011-0100377 | A | 9/2011 |
| KR | 10-2011-0124472 | A | 11/2011 |

* cited by examiner

DISPLAY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a continuation reissue application of Reissue application Ser. No. 15/662,126, filed Jul. 27, 2017, now U.S. Reissued Pat. No. RE47,839, and is also a reissue of U.S. Pat. No. 9,908,134, issued Aug. 4, 2015, which* claims the benefit of the Korean Patent Application No. 10-2012-0032333 filed on Mar. 29, 2012[, which]. *Each of the above U.S. and Korean Patent Applications* is hereby incorporated by reference as if fully set forth herein.

BACKGROUND

1. Field of the Disclosure

The present disclosure relates to a liquid crystal display (LCD) device, and more particularly, to an LCD device that includes a sensing electrode for sensing a user's touch.

2. Discussion of the Related Art

Generally, since LCD devices are driven with a low operating voltage, the LCD devices have low power consumption and are used in portable devices. Accordingly, the LCD devices are widely applied to various fields such as notebook computers, monitors, spacecrafts, airplanes, etc.

LCD devices include a lower substrate, an upper substrate, and a liquid crystal layer formed between the lower substrate and the upper substrate. In the LCD devices, the alignment of liquid crystal in the liquid crystal layer is adjusted with an electric field, and thus, light transmittance of the liquid crystal layer is adjusted, thereby displaying an image.

In the LCD devices, a mouse or a keyboard is generally used as an input means. However, a touch screen that enables a user to directly input information with a finger or a pen is much applied to navigation systems, portable terminals, appliances, etc.

Hereinafter, a related art LCD device using a touch screen will be described in detail.

FIG. 1 is a sectional view schematically illustrating a related art LCD device.

As seen in FIG. 1, the related art LCD device includes a liquid crystal panel 10 and a touch screen 20.

The liquid crystal panel 10 displays an image, and includes a lower substrate 12, an upper substrate 14, and a liquid crystal layer 16 formed between the lower substrate 12 and the upper substrate 14.

The touch screen 20 is formed at a top of the liquid crystal panel 10, and senses a user's touch. The touch screen 20 includes a touch substrate 22, a first sensing electrode 24 formed at a bottom of the touch substrate 22, and a second sensing electrode 26 formed at a top of the touch substrate 22.

The first sensing electrode 24 is widthwise arranged at the bottom of the touch substrate 22, and the second sensing electrode 26 is lengthwise arranged at the top of the touch substrate 22. Therefore, when a user touches a certain position, a capacitance between the first and second sensing electrodes 24 and 26 is changed at the touched position, and thus, the touch screen 20 senses the position at which the capacitance has been changed, thereby sensing the user's touch position.

However, since the related art LCD device has a structure in which the touch screen 20 is separately formed at the top of the liquid crystal panel 10, due to the touch screen 20, the entire thickness of the related art LCD device increases, a manufacturing process is complicated, and the manufacturing cost increases.

SUMMARY

An LCD device includes: a plurality of gate lines and data lines cross-arranged on a lower substrate to define a plurality of pixels; a pixel electrode in each of the pixels; a plurality of common electrode blocks pattern-formed that generate an electric field with the pixel electrode and sensing a touch of a user; a plurality of sensing lines, wherein when the sensing lines are electrically connected to one of the common electrode blocks, the sensing lines are electrically insulated from the other common electrode blocks; a plurality of pad parts arranged to be separated from each other at predetermined intervals along a corresponding sensing line, and having a line width thicker than the sensing line; and a contact part disposed between a corresponding pad part and a corresponding common electrode block, and electrically connecting a corresponding sensing line and the common electrode block, wherein the contact part is formed to contact at least one or more of a plurality of the pad parts included in a corresponding sensing line which is electrically connected to one of the common electrode blocks.

In another aspect of the present invention, there is provided a method of manufacturing an LCD device which includes: sequentially forming a gate electrode, a gate dielectric, a semiconductor layer, a source electrode, a drain electrode, and a first protective layer on a lower substrate; and forming a pixel electrode electrically connected to the drain electrode, a plurality of common electrode blocks pattern-formed for generating an electric field with the pixel electrode and sensing a touch of a user, a plurality of sensing lines, a plurality of pad parts formed to be separated from each other at predetermined intervals along a corresponding sensing line and having a line width thicker than the sensing line, and a contact part formed between a corresponding pad part and a corresponding common electrode block and electrically connecting a corresponding sensing line and the common electrode block, wherein when the sensing lines are electrically connected to one of the common electrode blocks, the sensing lines are electrically insulated from the other common electrode blocks, wherein the contact part is formed to contact at least one or more of a plurality of the pad parts that are formed in an area overlapping a corresponding common electrode block and a corresponding sensing line are electrically connected.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device and a method of manufacturing the same according to the present invention will be described in detail with reference to the accompanying drawings.

In description of embodiments of the present invention, when a structure is described as being formed at an upper portion/lower portion of another structure or on/under the other structure, this description should be construed as including a case where the structures contact each other and moreover a case where a third structure is disposed therebetween.

<LCD Device>

Figure 1:
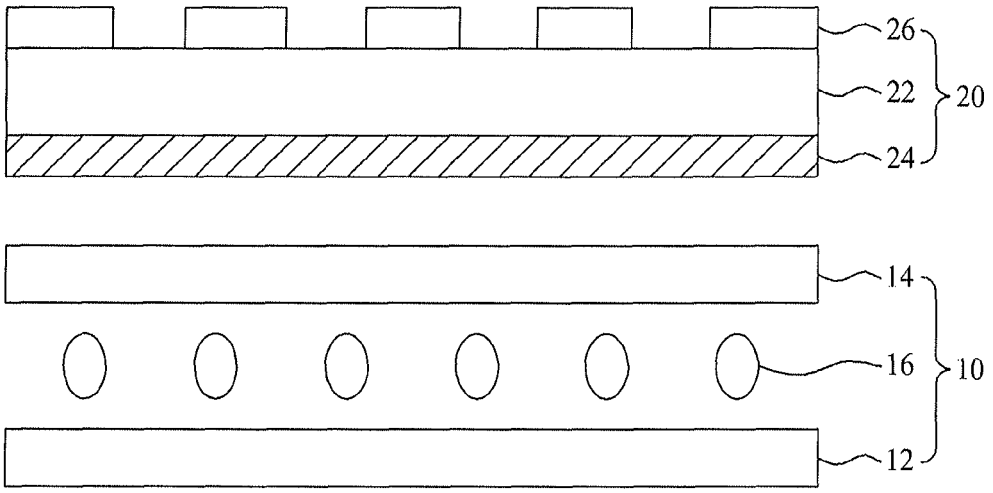
FIG. 1 [ Related Art ]
FIG. 1 is a sectional view schematically illustrating a related art LCD device.
Figure 2:
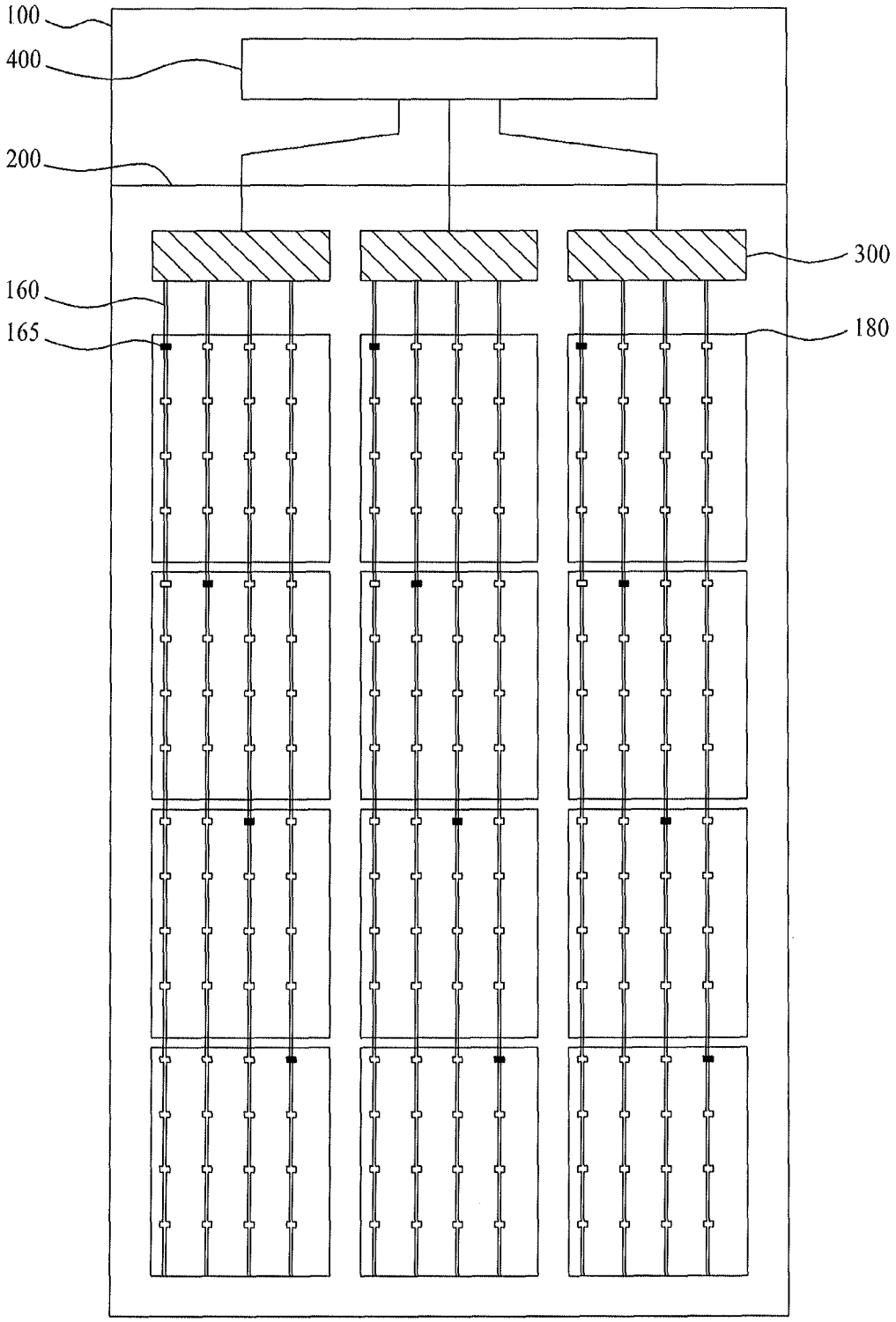
FIG. 2 is a plan view schematically illustrating an LCD device according to the present invention.
Figure 3:
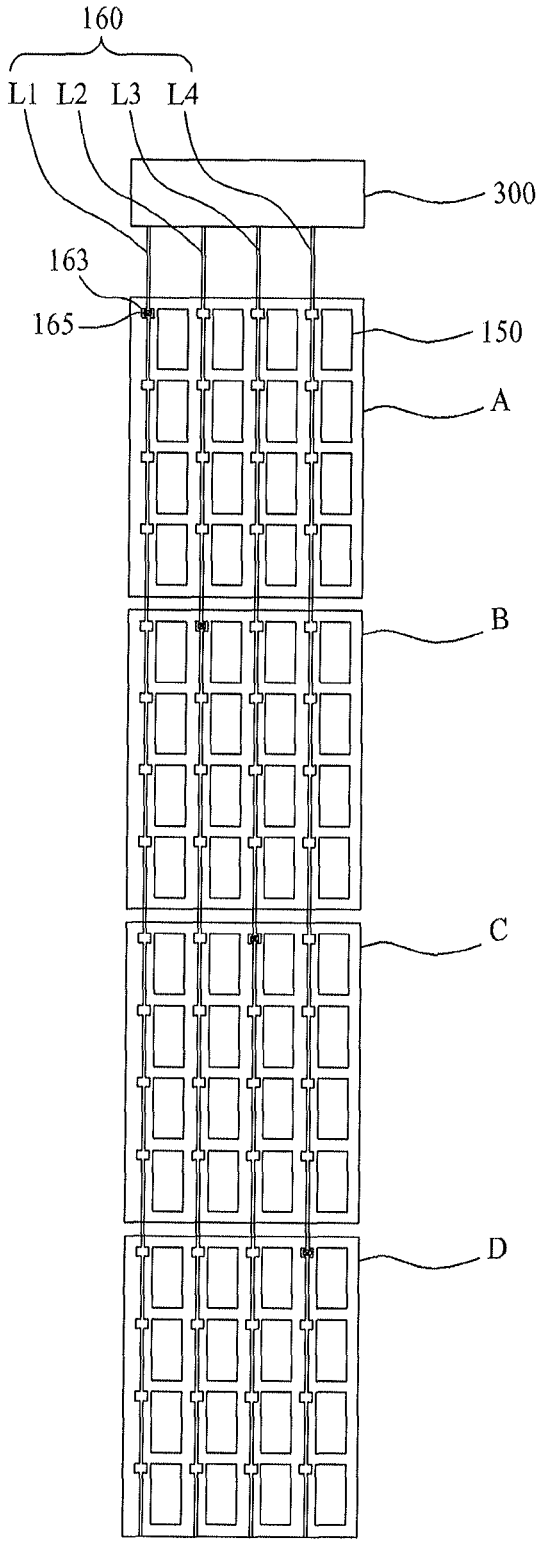
FIG. 3 is a view for describing the principle that senses a user's touch position in a sensing line of the LCD device according to the present invention.
Figure 4:
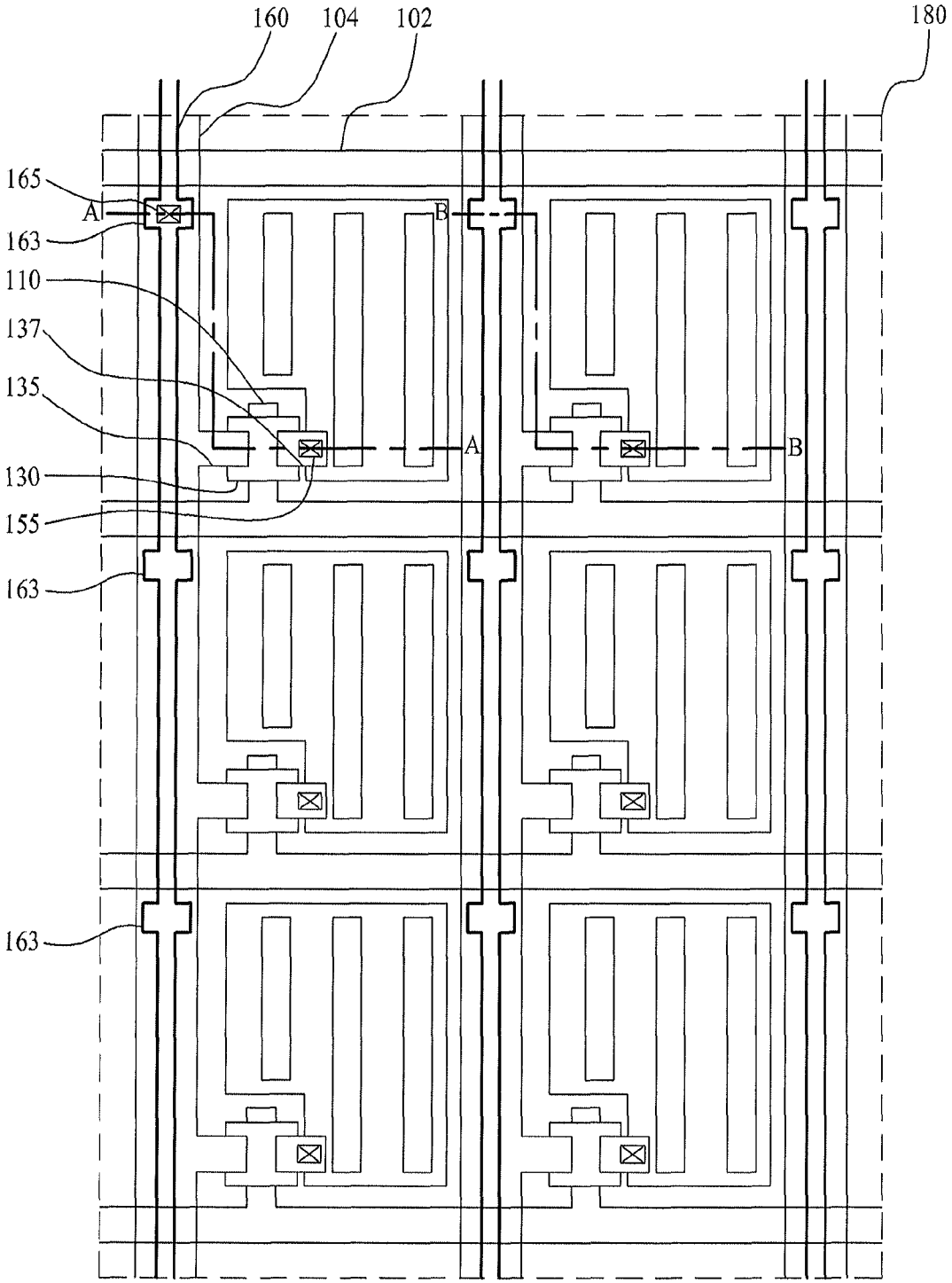
FIG. 4 is a view illustrating an embodiment of the LCD device according to the present invention.

FIG. 2 is a plan view schematically illustrating an LCD device according to the present invention. FIG. 3 is a view for describing the principle that senses a user's touch position in a sensing line of the LCD device according to the present invention. FIG. 4 is a view illustrating an embodiment of the LCD device according to the present invention.

As seen in FIGS. 2 to 4, the LCD device according to the present invention includes a lower substrate 100, a gate line 102, a data line 104, a gate electrode 110, a semiconductor layer 130, a source electrode 135, a drain electrode 137, a pixel electrode 150, a sensing line 160, a pad part 163, a 50 contact part 165, a common electrode block 180, a slit 190, an upper substrate 200, a multiplexer 300, and a sensing circuit part 400.

The lower substrate 100 may be formed of glass or transparent plastic.

The gate line 102 is widthwise arranged on the lower substrate 100, and the data line 104 is lengthwise arranged on the lower substrate 100. A plurality of the gate lines 102 and a plurality of the data lines 104 are arranged to intersect, thereby defining a plurality of pixels.

The gate line 102 is illustrated as being arranged in a straight-line shape, and the data line 104 is illustrated as being arranged in a straight-line shape. However, the present invention is not limited thereto. As another example, the data line 104 may be arranged in a curved-line shape.

A thin film transistor (TFT) is formed as a switching element in each of the pixels. The TFT includes the gate electrode 110, the semiconductor layer 130, the source electrode 135, and the drain electrode 137. The TFT may be formed in a bottom gate structure in which the gate electrode 110 is disposed under the semiconductor layer 130, or formed in a top gate structure in which the gate electrode 110 is disposed on the semiconductor layer 130.

The pixel electrode 150 is formed in each pixel, and particularly, is formed in a type corresponding to the type of each pixel.

The sensing line 160 includes the pad part 163, and applies an electrical signal to the common electrode block 180. The sensing line 160 is electrically connected to the common electrode block 180, and the sensing circuit part 400 is connected to a distal end of the sensing line 160. Thus, when a user touches the common electrode block 180, the electrical signal is applied to the sensing circuit part 400 through the sensing line 160, and thus, the user's touch position is sensed.

When the sensing line 160 is electrically connected to one of a plurality of the common electrode blocks 180, the sensing line 160 is electrically insulated from the other common electrode blocks 180, and detects a user's touch position.

A detailed description on this will be made with reference to FIG. 3. In FIG. 3, four common electrode blocks A to D (180) and four sensing lines L1 to L4 (160) are illustrated.

As seen in FIG. 3, the sensing line L1 (160) is connected to the common electrode block A (180) through the contact part 165, and electrically insulated from the other common electrode blocks B to D (180). Thus, when a user touches the common electrode block A (180), an electrical signal corresponding to the touch is transferred to the sensing line L1 (160), and thus, the user's touch position is detected.

In this way, the sensing line L2 (160) is connected to the common electrode block B (180) through the contact part 165, and electrically insulated from the other common electrode blocks A, C and D (180). Thus, when a user touches the common electrode block B (180), an electrical signal corresponding to the touch is transferred to the sensing line L2 (160), and thus, the user's touch position is detected.

The sensing line L3 (160) is connected to the common electrode block C (180) through the contact part 165, and electrically insulated from the other common electrode blocks A, B and D (180). Thus, when a user touches the common electrode block C (180), an electrical signal corresponding to the touch is transferred to the sensing line L3 (160), and thus, the user's touch position is detected.

The sensing line L4 (160) is connected to the common electrode block D (180) through the contact part 165, and electrically insulated from the other common electrode blocks A to C (180). Thus, when a user touches the common electrode block D (180), an electrical signal corresponding to the touch is transferred to the sensing line L4 (160), and thus, the user's touch position is detected.

According to the above-described structure of the common electrode block 180 and the sensing line 160, a user's touch position is detected on an X-Y plane by using only the sensing line 160 which is formed to be extended only in one direction of the lower substrate 100.

Accordingly, the present invention can simplify the structure of the LCD device and save the cost compared to the related art LCD device in which the sensing lines 160 are formed in two directions (i.e., the X-axis direction and the Y-axis direction).

The sensing line 160 applies an electrical signal to the common electrode block 180, and reduces the resistance of the common electrode.

The common electrode block 180 is generally formed of a transparent material such as indium tin oxide (ITO), but the transparent material has a high resistance. For this reason, by connecting the sensing line 160 (which is formed of a metal material having excellent conductivity) to the common electrode block 180, the resistance of the common electrode block 180 can decrease. For example, the sensing line 160 may be formed of one selected among from Mo, Al, and Cu, or an alloy thereof.

The sensing line 160 may be formed in a direction parallel to the gate line 102 or a direction parallel to the data line 104. According to the present invention, although the sensing line 160 may be formed in a direction parallel to the gate line 102 or a direction parallel to the data line 104, a user's touch position is detected on the X-Y coordinate plane.

However, an aperture ratio is reduced due to the sensing line 160. To overcome this limitation, the sensing line 160 formed in parallel to the data line 104 may overlap the data line 104, and moreover, the sensing line 160 formed in parallel to the gate line 102 may overlap the gate line 102.

The pad part 163 is formed in plurality, and the plurality of pad parts 163 are separated from each other at predetermined intervals along the sensing line 160. The pad part 163 may be formed to have a line width broader than that of the sensing line 160. That is, the sensing line 160 is electrically connected to the common electrode block 180 through the contact part 165 contacting the pad part 163. For a smooth connection between the sensing line 160 and the common electrode block 180, the sensing line may include the pad part 163 having a line width broader than that of the sensing line 160.

In this case, the pad part 163 may be formed to have a constant line width regardless of whether the pad part 163 is connected to the contact part 165. That is, the pad part 163 is formed on the sensing line 160 for a connection between the sensing line 160 and the common electrode block 180, but, irrespective of whether the contact part 165 is on (or under) the pad part 163, the pad part 163 is formed to have a constant line width.

To provide a description on this as an example, as seen in FIG. 3, four pad parts 163 are formed at certain intervals along the sensing line L1 (160), in an area overlapping the common electrode block A (180), and, although the contact part 165 is formed in only one of the four pad parts 163, the four pad parts 163 are formed to have the same line width.

The pad part 163 is formed in plurality, and the plurality of pad parts 163 are separated from each other at certain intervals along the sensing line 160. As seen in FIG. 3, in an embodiment, the pad parts 163 may be separated from each other at certain intervals, and one pad part 163 may be formed in each pixel. Also, as seen in FIG. 4, the pad part 163 may be formed just under the gate line 102. In the above-described embodiment, it has been described above that one pad part 163 is formed in each pixel and formed just under the gate line 102, but the pad part 163 of the LCD device according to the present invention is not limited thereto.

One sensing line 160 includes a plurality of the pad parts 163 that are formed to be separated from each other at certain intervals, and the pad parts 163 are formed at respective positions symmetric with the pad parts 163 included in an adjacent sensing line 160.

In an embodiment, as seen in FIG. 3, a plurality of the pad parts 163 included in the sensing line L1 (160) are formed at respective positions symmetric with a plurality of the pad parts 163 included in the sensing line L2 (160) adjacent thereto. That is, a first pad part 163 of the sensing line L1 (160) and a first pad part 163 of the sensing line L2 (160) are formed on one straight line in a direction vertical to the length direction of the sensing line 160.

When the pad part 163 is formed in only the sensing lines 160 corresponding to a position at which the contact part 165 is formed or the pad part 163 is not formed at a position symmetric with the pad part 163 of an adjacent sensing line 160, a stain occurs in the surface of the display panel due to the non-uniform line width of the sensing line 160 when reproducing images. The stain is caused by the non-uniform distribution of parasitic capacitances due to the pad part 163 disposed near the pixel electrode 150, in which case the distribution form of the parasitic capacitances may be various forms such as a flag form.

However, when a plurality of pad parts 163 that are formed to be separated from each other at certain intervals along the sensing line 160 are formed at respective positions symmetric with the pad parts 163 of an adjacent sensing line 160, parasitic capacitances are uniformly distributed on the entire surface of the display panel, and thus, the stain of the surface of the display panel is prevented when reproducing images.

The contact part 165 is formed between the pad part 163 and the common electrode block 180, and electrically connects the sensing line 160 and the common electrode block 180.

The sensing line 160 includes a plurality of the pad parts 163 that are formed to be separated from each other at certain intervals, in which case the contact part 165 is formed on (or under) at least one or more of a plurality of pad parts 163 and electrically connects the sensing line 160 and the common electrode block 180.

In this case, as described above, when one sensing line 160 is electrically connected to one common electrode block 180, the one sensing line 160 is electrically insulated from the other common electrode blocks 180, and thus, the contact part 165 is not simultaneously formed in different common electrode blocks 180 with respect to the one sensing line 160.

To provide a description on this with FIG. 3 as an example, when the sensing line L1 (160) is electrically connected to the common electrode block A (180) through the contact part 165, the contact part 165 is not formed in an area in which the sensing line L1 overlaps the other common electrode blocks B to D (180).

The contact part 165 may be formed to contact at least one or more of a plurality of the pad parts 163 included in the sensing line 160 which is electrically connected to one of the plurality of common electrode blocks 180.

A description on this will be made with reference to FIG. 3 as an example. In FIG. 3, the sensing line L1 (160) is illustrated as being electrically connected to the common electrode block A (180) through one contact part 165. However, since a total of four pad parts 163 are formed in an area in which the common electrode block A (180) overlaps the sensing line L1 (160), the contact part 165 may be formed to contact at least one or more of the four pad parts 163.

To prevent the reduction in an aperture ratio, the contact part 165 may be formed in a non-transmissive area. The non-transmissive area is an area except an area in which light passes through a pixel, and for example, denotes an area in which the data line 104 and the gate line 102 are formed.

In FIG. 4, the contact part 165 is illustrated as being formed adjacently to the gate line 102, but is not limited thereto. Depending on the case, the contact part 165 may be formed adjacently to the data line 104 and the source electrode 135.

The common electrode block 180 is formed on a layer different from that of the pixel electrode 150, and, the common electrode block 180 and the pixel electrode 150 generate an electric field to drive liquid crystal. That is, the common electrode block 180 acts as a sensing electrode that senses a user's touch position.

In order to use the common electrode block 180 as a sensing electrode, the common electrode block 180 is formed in plurality, in which case the plurality of common electrode blocks 180 are separated from each other in a certain pattern. The common electrode blocks 180 may be formed to have a size corresponding to one or more pixels, and particularly, how many pixels the size of the common electrode block 180 corresponds to depends on the touch resolution of the LCD device.

That is, when an area corresponding to a number of pixels is formed as one common electrode block 180, a touch resolution decreases in inverse proportion to the number of pixels. For example, when an area corresponding to a too small number of pixels is formed as one common electrode block 180, a touch resolution increases, but the number of sensing lines 160 increases.

The slit 190 may be formed as at least one or more, inside the pixel electrode 150 or the common electrode block 180.

In this way, when the slit 190 is disposed inside the pixel electrode 150 or the common electrode block 180, a fringe field may be generated between the pixel electrode 150 and the common electrode block 180 through the slit 190, and liquid crystal may be driven with the fringe field. That is, an LCD device may be implemented in a fringe field switching mode.

Figure 7:
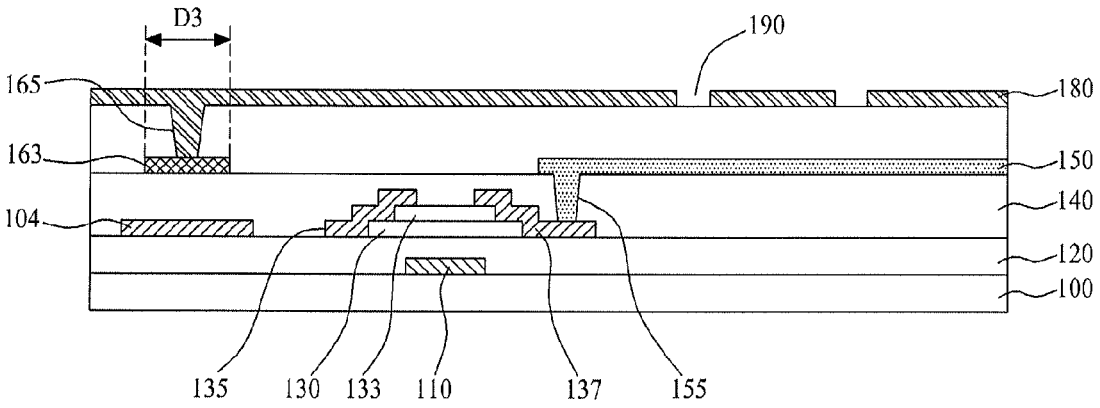
FIG. 7 is a view illustrating a second embodiment corresponding to a sectional surface taken along line A-A of FIG. 4.

When the slit 190 is disposed inside the common electrode block 180, the plurality of common electrode blocks 180 are formed on the pixel electrode 150 with a second protective layer 170 therebetween (see FIG. 7).

Figure 5:
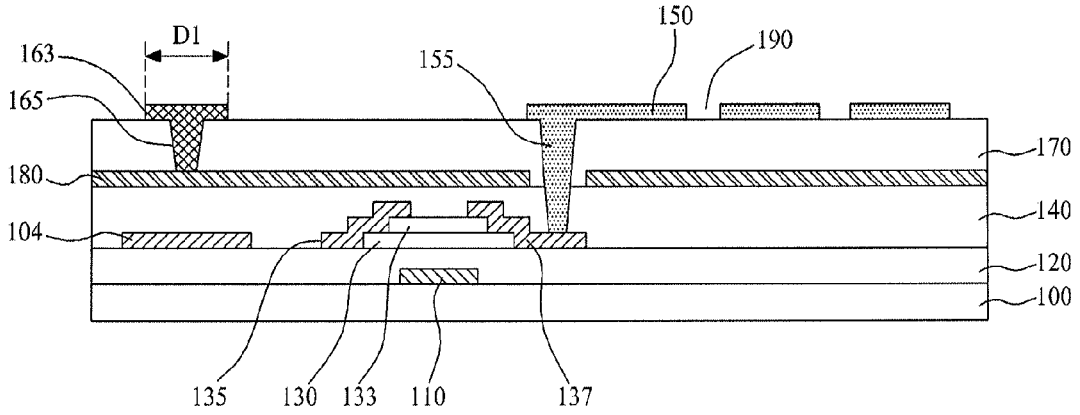
FIG. 5 is a view illustrating a first embodiment corresponding to a sectional surface taken along line A-A of FIG. 4.

On the other hand, when the slit 190 is disposed inside the pixel electrode 150, the pixel electrode 150 is formed on the common electrode block 180 with the second protective layer 170 therebetween (see FIG. 5).

The upper substrate 200 is facing-coupled to the lower substrate 100, and a liquid crystal layer is formed between the upper substrate 200 and the lower substrate 100.

Although not shown, a high-resistance conductive layer (not shown) may be formed at a rear surface of the upper substrate 200. The high-resistance conductive layer is a transparent material that passes through light incident from a liquid crystal panel, and is formed of a conductive material having conductivity for grounding an electric charge (which is generated with static electricity on the liquid crystal panel) to a ground pad (not shown) formed in the lower substrate 100. The high-resistance conductive layer is formed to have a high resistance (for example, 50 MΩ/sqr to 5 GΩ/sqr), for enhancing performance to detect a user's touch.

The high-resistance conductive layer allows an electric charge generated in the liquid crystal panel to flow to the ground (GND), thereby enhancing the electrostatic discharge (ESD) shielding performance of an LCD device with built-in touch electrodes.

That is, as described above, the high-resistance conductive layer is formed of a high-resistance material having a resistance value of 50 MΩ/sqr to 5 GΩ/sqr, and prevents the shielding of the influence of a user's finger, thus enhancing the touch detection performance of an LCD device with a built-in touch screen.

The multiplexer (MUX) 300 is coupled between the sensing line 160 and the sensing circuit part 400, and reduces the number of sensing lines 160 disposed in the sensing circuit part 400.

In FIG. 2, a 4:1 multiplexer 300 is illustrated as an example, but is not limited thereto. A multiplexer 300 having various combinations such as a 8:1 multiplexer or a 16:1 multiplexer may be used.

When the multiplexer 300 is used, the number of sensing lines 160 disposed in the sensing circuit part 400 is reduced, and thus, the Bexel width is reduced, and the aperture ratio of an outer portion increases.

The multiplexer 300 may be formed on the lower substrate 100 with the sensing line 160 formed therein, built in a driving IC, or implemented as a separate multiplexer 300 chip.

The sensing circuit part 400 is connected directly to the sensing line 160 or connected to the sensing line 160 through the multiplexer 300, and, when a user touches the common electrode block 180, the sensing circuit part 400 senses whether there is a touch and a touched position, with a signal applied along the sensing line 160.

Hereinafter, various embodiments of the present invention will be described in more detail with reference to FIGS. 5 to 10 illustrating a sectional structure of the LCD device according to the present invention.

Figure 6:
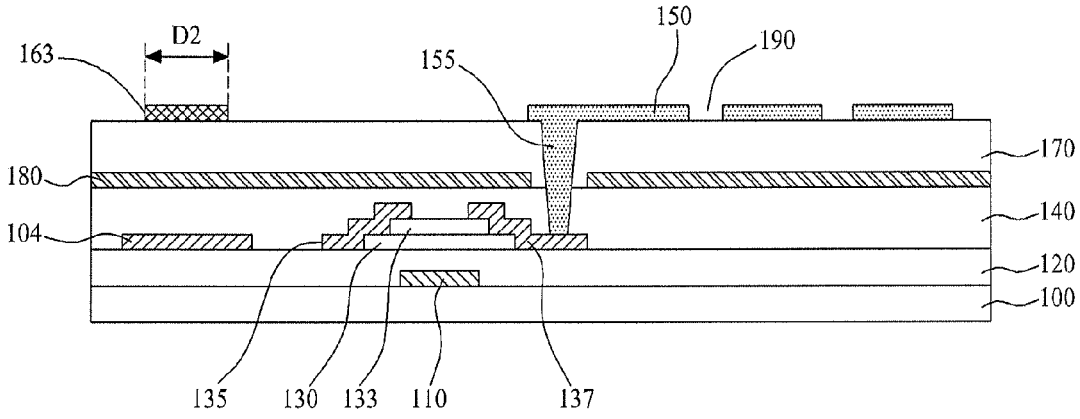
FIG. 6 is a view illustrating a first embodiment corresponding to a sectional surface taken along line B-B of FIG. 4.

FIG. 5 is a view illustrating a first embodiment corresponding to a sectional surface taken along line A-A of FIG. 4. FIG. 6 is a view illustrating a first embodiment corresponding to a sectional surface taken along line B-B of FIG. 4.

As seen FIGS. 5 and 6, an LCD device according to the first embodiment of the present invention includes a lower substrate 100, a gate electrode 110, a gate dielectric 120, a semiconductor layer 130, an etch stopper 133, a source electrode 135, a drain electrode 137, a first protective layer 140, a pixel electrode 150, a sensing line 160 (see FIG. 4), a pad part 163, a contact part 165, a second protective layer 170, and a common electrode block 180. The LCD device has a pixel electrode top structure in which the pixel electrode 150 is formed on the common electrode block 180.

The lower substrate 100 may be formed of glass or transparent plastic.

The gate electrode 110 branches from a gate line 102 formed on the lower substrate 100, and is formed of a conductive material.

The gate dielectric 120 is formed on the gate electrode 110, and may be formed of SiOx or SiNx.

The semiconductor layer 130 is formed at a portion corresponding to the gate electrode 110, on the gate dielectric 120. When a gate voltage is applied to the gate electrode 110, a channel that enables a current to flow between the source electrode 135 and the drain electrode 137 is formed. The semiconductor layer 130 may be oxide or amorphous semiconductor.

The etch stopper 133 is formed on the semiconductor layer 130, and protects the semiconductor layer 130. The etch stopper 133 may be formed of SiOx or SiNx. However, depending on the case, the etch stopper 133 may not be provided.

The source electrode 135 is formed to be extended from the data line 104, and formed of a low-resistance conductor for minimizing the operation delay of a TFT due to a pane load.

The drain electrode 137 is formed apart from the source electrode 135, on the semiconductor layer 130. The drain electrode is formed of a conductor, which may be a transparent conductor such as ITO.

The first protective layer 140 is formed on the source electrode 135 and the drain electrode 137, and may be formed of SiOx or SiNx.

The common electrode block 180 is formed on the first protective layer 140. Here, a plurality of the common electrode blocks 180 may be formed at certain intervals, for preventing the pixel electrode 150 and the common electrode block 180 from being electrically short-circuited in the position of a pixel electrode contact hole 155 later.

The second protective layer 170 is formed on the common electrode block 180, and may be formed of SiOx or SiNx.

The sensing line 160 (see FIG. 4), the pad part 163, and the contact part 165 are formed on the second protective layer 170. The pad part 163 and common electrode block 180 included in the sensing line 160 (see FIG. 4) are electrically connected through the contact part 165.

In this case, in FIG. 5 illustrating a sectional view taken along line A-A of FIG. 4, the contact part 165 is formed under the pad part 163. However, in FIG. 6 illustrating a sectional view taken along line B-B of FIG. 4, the contact part 165 may not be provided. This, as described above, is because when one sensing line is electrically connected to one common electrode block 180, the one sensing line is insulated from the other common electrode blocks 180, and thus, the contact part 165 is not formed under all of the pad parts 163.

The line widths D1 and D2 of the pad part 163 may be equal, irrespective of whether the contact part 165 is formed. This, as described above, is because when the pad part 163 formed along a sensing line is not disposed at a symmetric position or the line widths of the pad part 163 differ, a stain is formed on the display panel.

The pixel electrode 150 is formed apart from the pad part 163, on the second protective layer 170. The pixel electrode 150 is electrically connected to the drain electrode 137 through the pixel electrode contact hole 155.

In this case, a slit 190 is disposed inside the pixel electrode 150. A fringe field may be generated between the pixel electrode 150 and the common electrode block 180 through the slit 190, and liquid crystal may be driven with the fringe field. That is, an LCD device may be implemented in a fringe field switching mode.

Figure 8:
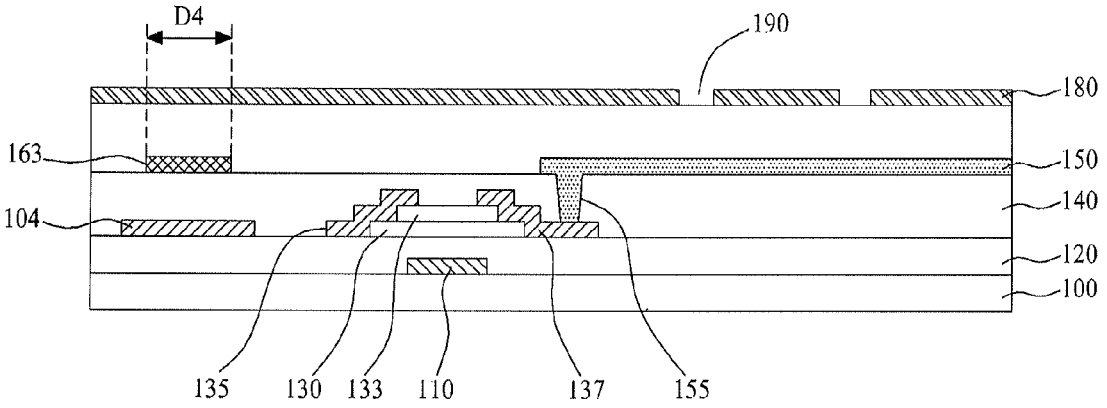
FIG. 8 is a view illustrating a second embodiment corresponding to a sectional surface taken along line B-B of FIG. 4.

FIG. 7 is a view illustrating a second embodiment corresponding to a sectional surface taken along line A-A of FIG. 4. FIG. 8 is a view illustrating a second embodiment corresponding to a sectional surface taken along line B-B of FIG. 4.

As seen FIGS. 7 and 8, an LCD device according to the second embodiment of the present invention includes a lower substrate 100, a gate electrode 110, a gate dielectric 120, a semiconductor layer 130, an etch stopper 133, a source electrode 135, a drain electrode 137, a first protective layer 140, a pixel electrode 150, a sensing line 160 (see FIG. 4), a pad part 163, a contact part 165, a second protective layer 170, and a common electrode block 180. The LCD device has a common electrode block 180 top structure in which the common electrode block 180 is formed on the pixel electrode 150. Except for the common electrode block 180 top structure, the embodiment of the FIGS. 7 and 8 is the same as the embodiment of FIGS. 5 and 6, and thus, a repetitive description is not provided.

The pixel electrode 150 is formed on the first protective layer 140, and may be formed of a transparent conductor such as ITO. The pixel electrode 150 is electrically connected to the drain electrode 137 through a pixel electrode contact hole 155 formed on the first protective layer 140.

The pad part 163 is formed apart from the pixel electrode 150, on the same layer as that of the pixel electrode 150. The pad part 163 may be formed of one selected among from Mo, Al, and Cu, or an alloy thereof.

The second protective layer 170 is formed on the pixel electrode 150 and the pad part 163, and may be formed of SiOx or SiNx.

The common electrode block 180 is formed on the second protective layer 170, and may be formed of a transparent conductor such as ITO. The common electrode block 180 is electrically connected to the pad part 163 through the contact part 165.

In this case, it can be seen that the contact part 165 is formed on the pad part 163 in FIG. 7 but the contact part 165 is not provided in FIG. 8. As described above, when one sensing line is electrically connected to one common electrode block 180, the one sensing line is insulated from the other common electrode blocks 180, and thus, the contact part 165 is not formed on all of the pad parts 163.

The line widths D3 and D4 of the pad part 163 may be equal, irrespective of whether the contact part 165 is formed. This, as described above, is because when the pad part 163 formed along a sensing line is not disposed at a symmetric position or the line widths of the pad part 163 differ, a stain is formed on the display panel.

In this case, a slit 190 is disposed inside the common electrode block 180. A fringe field may be generated between the pixel electrode 150 and the common electrode block 180 through the slit 190, and liquid crystal may be driven with the fringe field. That is, an LCD device may be implemented in a fringe field switching mode.

Figure 9:
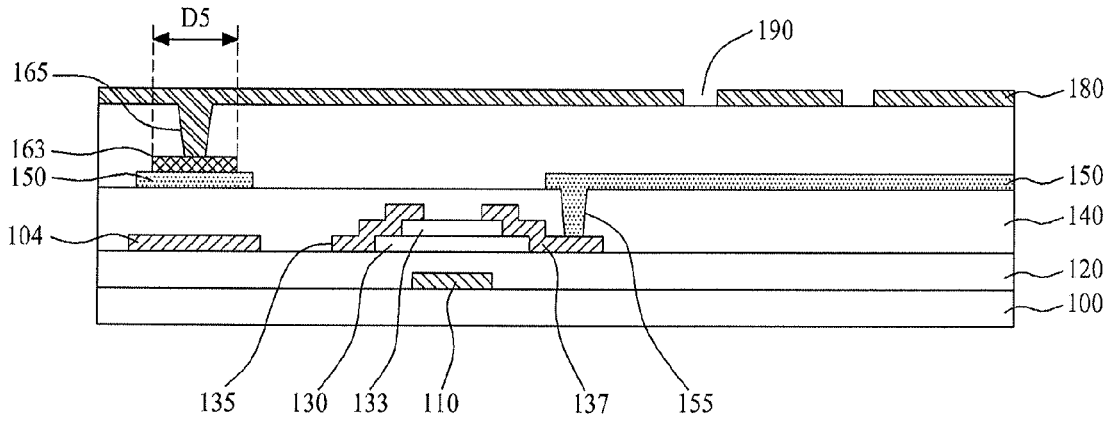
FIG. 9 is a view illustrating a third embodiment corresponding to a sectional surface taken along line A-A of FIG. 4.
Figure 10:
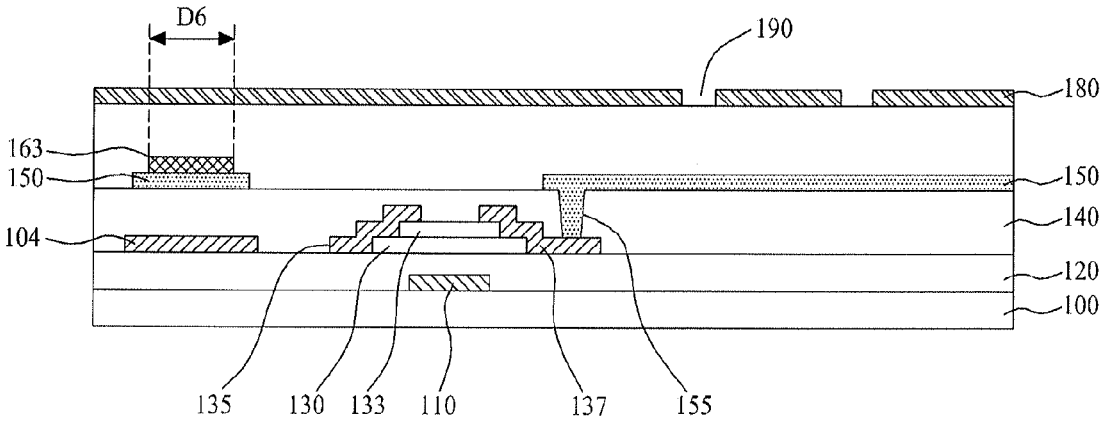
FIG. 10 is a view illustrating a third embodiment corresponding to a sectional surface taken along line B-B of FIG. 4.

FIG. 9 is a view illustrating a third embodiment corresponding to a sectional surface taken along line A-A of FIG. 4. FIG. 10 is a view illustrating a third embodiment corresponding to a sectional surface taken along line B-B of FIG. 4.

As seen FIGS. 9 and 10, an LCD device according to the third embodiment of the present invention includes a lower substrate 100, a gate electrode 110, a gate dielectric 120, a semiconductor layer 130, an etch stopper 133, a source electrode 135, a drain electrode 137, a first protective layer 140, a pixel electrode 150, a sensing line 160 (see FIG. 4), a pad part 163, a contact part 165, a second protective layer 170, and a common electrode block 180. The LCD device has a common electrode block 180 top structure in which the common electrode block 180 is formed on the pixel electrode 150. Except for the vertical structure of the pixel electrode 150 and the pad part 163, the embodiment of the FIGS. 9 and 10 is the same as the embodiment of FIGS. 7 and 8, and thus, a repetitive description is not provided.

The pixel electrode 150 is formed under the pad part 163. That is, the pad part 163 is formed on the pixel electrode 150, but the pixel electrode 150 overlapping the pad part 163 is electrically insulated from the pixel electrode 150 electrically connected to the drain electrode 137.

Such a structure may be realized as follows. The pixel electrode 150 is formed by a photolithography process, and then, the sensing line 160 (see FIG. 4) and the pad part 163 are formed by a separate photolithography process, thereby realizing the structure. However, the structure may be efficiently realized using a half tone mask process.

That is, when the pixel electrode 150 and the sensing line 160 are simultaneously formed in one photolithography process by using the half tone mask process, the present invention can simplify a two-mask process to a one-mask process, for forming the pixel electrode 150 and the sensing line 160.

Accordingly, by performing one-time exposure process instead of two-time exposure process, a tack time is shortened, and the cost of materials used in an exposure process is saved.

<Method of Manufacturing LCD Device>

Figure 11A:
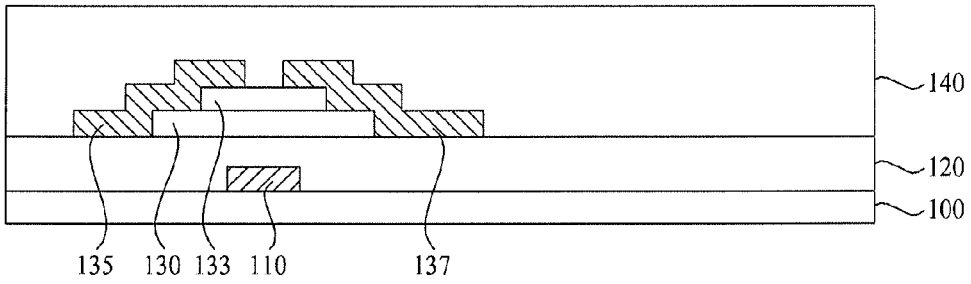
FIGS. 11A to 11C are sectional views illustrating a method of manufacturing an LCD device according to an embodiment of the present invention.
Figure 11B:
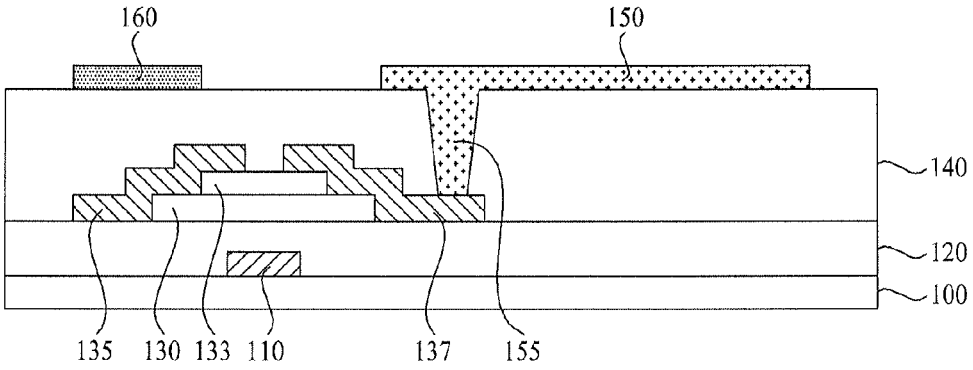
Figure 11C:
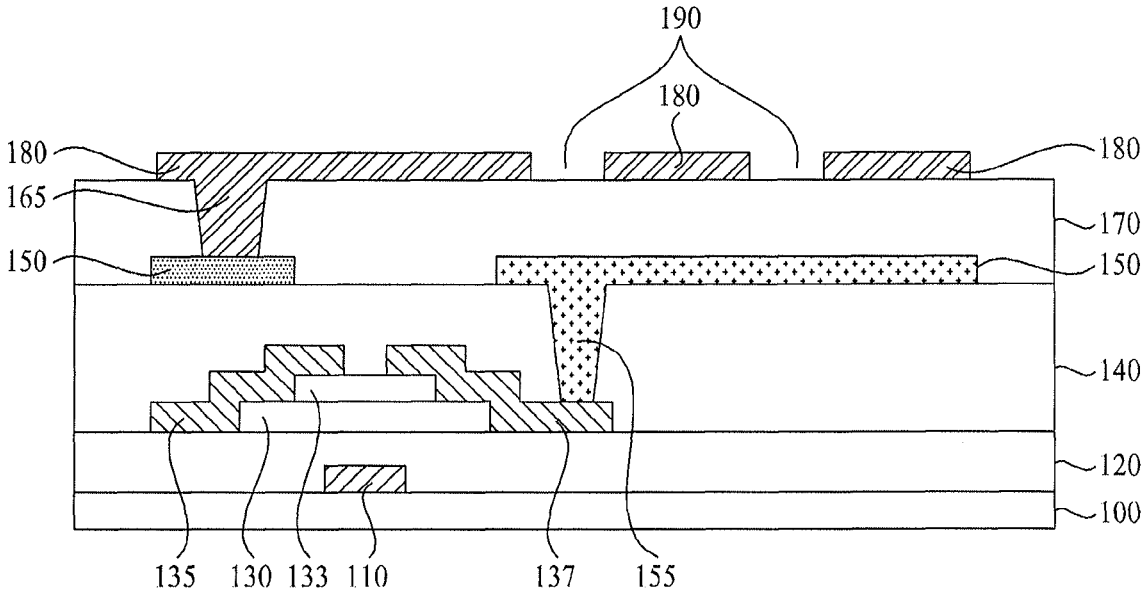

FIGS. 11A to 11C are sectional views illustrating a method of manufacturing an LCD device according to an embodiment of the present invention.

First, as seen in FIG. 11A, the gate electrode 110, the gate dielectric 120, the semiconductor layer 130, the etch stopper 133, the source electrode 135, the drain electrode 137, and the first protective layer 140 are sequentially formed on the lower substrate 100. Although not shown, the gate line 101 and the data line 104 are formed in the lower substrate 100.

Subsequently, as seen in FIG. 11B, the pixel electrode contact hole 155 is formed on the first protective layer 140, and then, by forming the pixel electrode 150, the drain electrode 137 is electrically connected to the pixel electrode 150. Also, the sensing line 160 is formed at a certain position.

The sensing line 160 may be formed in a direction parallel to the gate line 102 or a direction parallel to the data line 104. According to the present invention, although the sensing line 160 may be formed in a direction parallel to the gate line 102 or a direction parallel to the data line 104, a user's touch position is detected on the X-Y coordinate plane.

In this case, an aperture ratio is reduced due to the sensing line 160. To overcome this limitation, the sensing line 160 formed in parallel to the data line 104 may overlap the data line 104, and moreover, the sensing line 160 formed in parallel to the gate line 102 may overlap the gate line 102.

A plurality of the sensing lines 160 are separated from each other at certain intervals, and each of the sensing lines 160 includes a plurality of the pad parts 163 (see FIG. 3) having a line width thicker than that of the sensing line 160.

Subsequently, as seen in FIG. 11C, the second protective layer 170 is formed on the pixel electrode 150 and the sensing line 160, and then, by forming the contact part 165, the sensing line 160 is electrically connected to the common electrode block 180.

In this case, when the sensing line 160 is electrically connected to one of a plurality of the common electrode blocks 180, the sensing line 160 is electrically insulated from the other common electrode blocks 180, and thus, the contact part 165 is formed at a position at which one sensing line 160 is electrically connected to one common electrode block.

By forming the common electrode block 180 on the second protective layer 170, the sensing line 160 is electrically connected to the common electrode block 180.

Since the common electrode block 180 is used as a sensing electrode, the common electrode block 180 is formed in plurality to have a certain pattern. The common electrode block 180 may be formed to a size corresponding to one or more pixels, and particularly, how many pixels the size of the common electrode block 180 corresponds to depends on the touch resolution of the LCD device.

<Method of Manufacturing LCD Device Formed with Half Tone Mask>

Figure 12A:
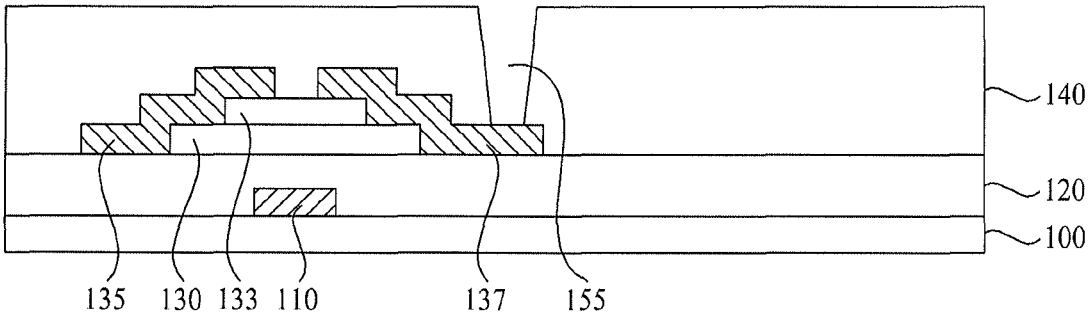
FIGS. 12A to 12D are sectional views illustrating a method of manufacturing an LCD device according to another embodiment of the present invention.
Figure 12B:
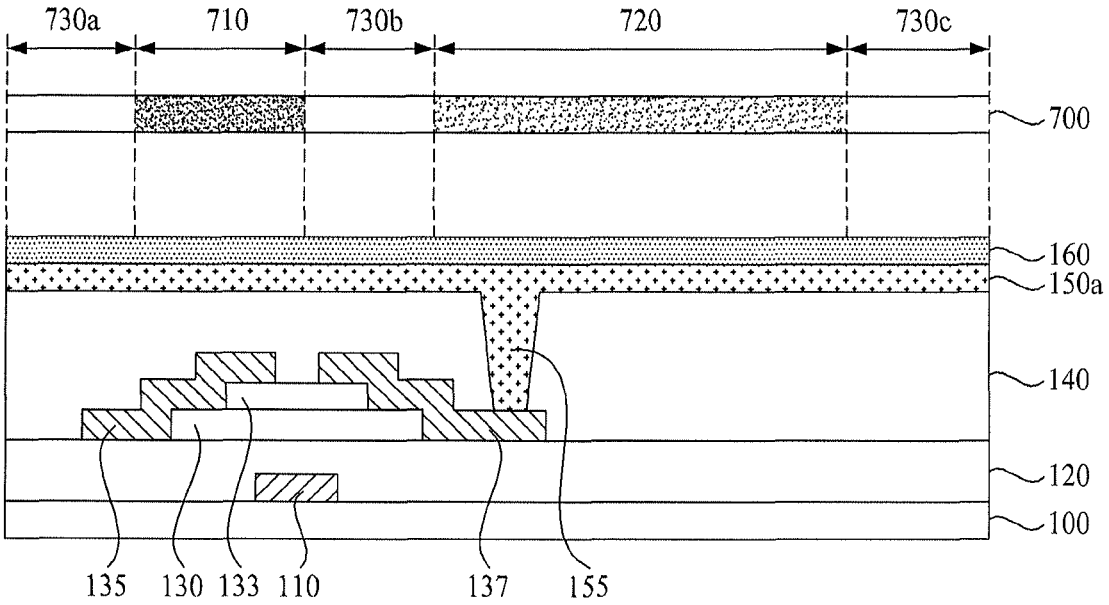
Figure 12C:
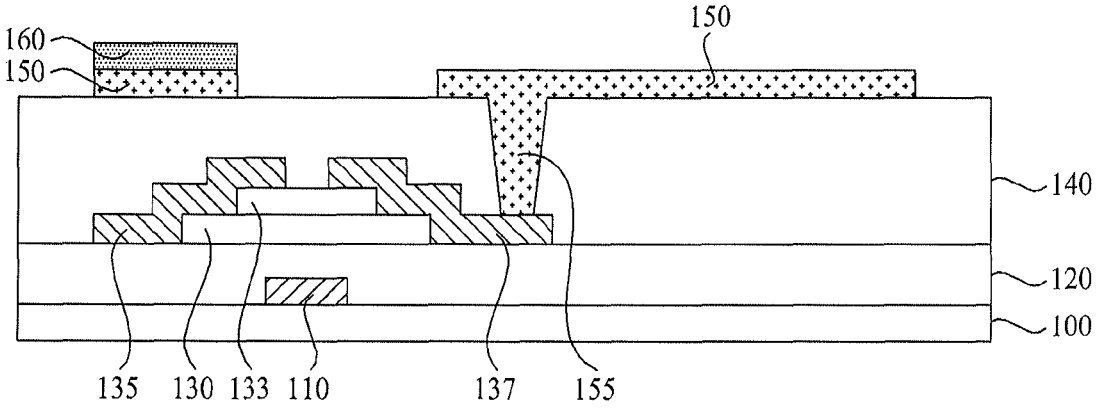

FIGS. 12A to 12C are sectional views illustrating a method of manufacturing an LCD device according to another embodiment of the present invention. The following description will focus on a configuration that is not repetitive of FIGS. 11A and 11C.

First, as seen in FIG. 12A, the gate electrode 110, the gate dielectric 120, the semiconductor layer 130, the etch stopper 133, the source electrode 135, the drain electrode 137, and the first protective layer 140 are sequentially formed on the lower substrate 100. The pixel electrode contact hole 155 is formed on the first protective layer 140.

Subsequently, as seen in FIG. 12B, a pixel electrode layer 150a and a sensing line layer 140a are sequentially stacked on the first protective layer 140.

A photoresist is stacked on the pixel electrode layer 150a and the sensing line layer 140a, and irradiates light using a half tone mask 700. Here, the half tone mask 700 includes a non-transmissive area 710 incapable of transmitting light, a semi-transmissive area 720 that transmits only partial light, and a transmissive areas 730a to 730c that transmits entire light.

Subsequently, a photoresist pattern is formed by developing the photoresist. In the photoresist pattern, a photoresist layer corresponding to the non-transmissive area 710 of the half tone mask 700 is left as-is, a photoresist layer corresponding to the semi-transmissive area 720 of the half tone mask 700 is partially left, and a photoresist layer corresponding to the transmissive area 730a to 730c of the half tone mask 700 is all removed.

Subsequently, as seen in FIG. 12C, the pixel electrode layer 150a and the sensing line layer 140a are etched using the photoresist pattern as a mask. An ashing process is performed on the photoresist pattern, and then, an etching process is performed on the photoresist pattern, thereby finally removing the photoresist pattern.

When the pixel electrode 150 and the sensing line 160 are formed in this way, a process of irradiating light is not performed twice but is performed once, thus saving the manufacturing time and cost.

Figure 12D:
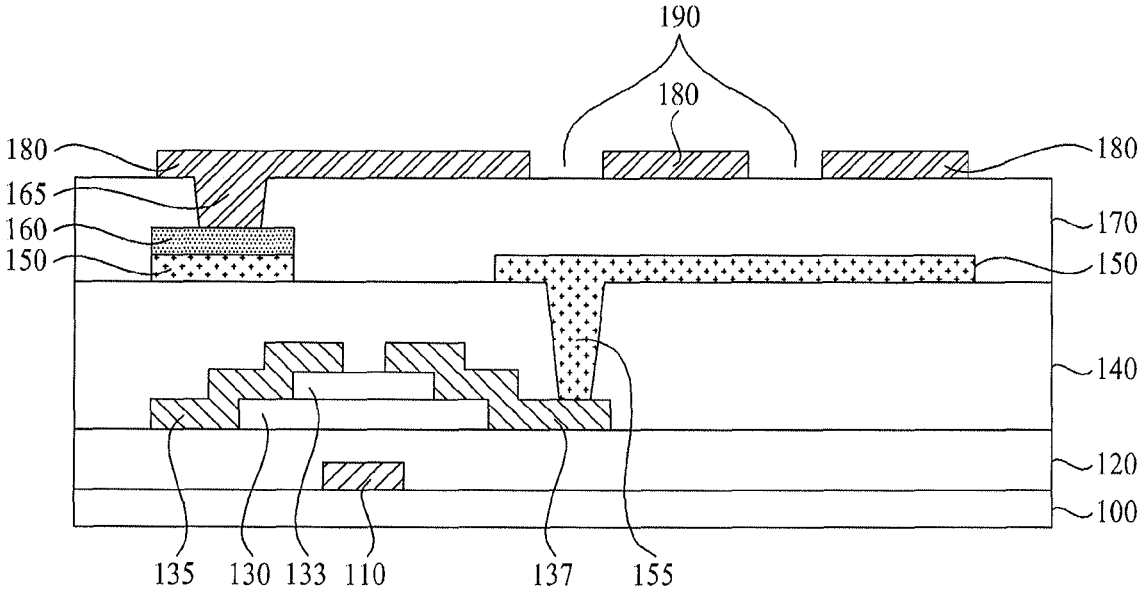

Subsequently, as seen in FIG. 12D, the second protective layer 170 is formed on the pixel electrode 150 and the sensing line 160, and the common electrode block 180 is pattern-formed on the second protective layer 170.

According to the present invention, the common electrode (or common electrode block) which is used to generate an electric field for driving liquid crystal is used as the sensing electrode for sensing a user's touch, and thus, unlike the related art, it is not required to separately dispose the touch screen at the top of the liquid crystal panel, thereby decreasing the thickness of the LCD device, simplifying a manufacturing process, and saving the manufacturing cost.

Moreover, according to the present invention, a user's touch position is detected on the X-Y plane by using only the sensing line which is formed to be extended only in one direction of the lower substrate, and thus, the present invention can simplify the structure of the LCD device and save the cost compared to the related art LCD device in which sensing lines are formed in two directions (i.e., the X-axis direction and the Y-axis direction).

Moreover, according to the present invention, the number of sensing lines disposed inside the sensing circuit part is reduced by using the multiplexer, thus decreasing the Bezel width and increasing the aperture ratio of an outer portion.

Moreover, according to the present invention, by forming the sensing line including the pad part having a constant line width irrespective of the contact part, a stain on the surface of the display panel is removed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

[1. A liquid crystal display (LCD) device, comprising:

a plurality of gate lines and data lines cross-arranged on a lower substrate to define a plurality of pixels;

a pixel electrode in each of the pixels;

a plurality of common electrode blocks pattern-formed that generate an electric field with the pixel electrode and sensing a touch of a user;

a plurality of sensing lines, wherein when the sensing lines are electrically connected to one of the common electrode blocks, the sensing lines are electrically insulated from the other common electrode blocks;

a plurality of pad parts arranged to be separated from each other at predetermined intervals along a corresponding sensing line, and having a line width thicker than the sensing line; and a contact part disposed between a corresponding pad part and a corresponding common electrode block, and electrically connecting a corresponding sensing line and the common electrode block, wherein the contact part is formed to contact at least one or more of a plurality of the pad parts comprised in a corresponding sensing line which is electrically connected to one of the common electrode blocks.]

[2. The LCD device of claim 1, wherein a pad part disposed in a corresponding sensing line is arranged at a position symmetric with a pad part formed in a sensing line adjacent to the corresponding sensing line.]

[3. The LCD device of claim 1, wherein each of the sensing lines overlaps a corresponding data line or a corresponding gate line.]

[4. The LCD device of claim 1, wherein each of the sensing lines is disposed in a direction parallel to a corresponding data line or a direction parallel to a corresponding gate line.]

[5. The LCD device of claim 1, wherein each of the pad parts has a constant line width irrespective of whether each pad part is electrically connected to the contact part.]

[6. The LCD device of claim 1, wherein the contact part is disposed in a non-transmissive area, for preventing a reduction in an aperture ratio.]

[7. The LCD device of claim 1, wherein the common electrode blocks are disposed on the pixel electrode with a second protective layer therebetween, and comprises at least one slit.]

[8. The LCD device of claim 1, wherein the pixel electrode is disposed on the common electrode block with a second protective layer therebetween, and comprises at least one slit.]

[9. The LCD device of claim 1, wherein a multiplexer is connected to a distal end of each of the sensing lines.]

[10. A method of manufacturing a liquid crystal display (LCD) device, comprising:

sequentially forming a gate electrode, a gate dielectric, a semiconductor layer, a source electrode, a drain electrode, and a first protective layer on a lower substrate; and forming a pixel electrode electrically connected to the drain electrode, a plurality of common electrode blocks pattern-formed for generating an electric field with the pixel electrode and sensing a touch of a user, a plurality of sensing lines, a plurality of pad parts formed to be separated from each other at predetermined intervals along a corresponding sensing line and having a line width thicker than the sensing line, and a contact part formed between a corresponding pad part and a corresponding common electrode block and electrically connecting a corresponding sensing line and the common electrode block, wherein when the sensing lines are electrically connected to one of the common electrode blocks, the sensing lines are electrically insulated from the other common electrode blocks, wherein the contact part is formed to contact at least one or more of a plurality of the pad parts that are formed in an area overlapping a corresponding common electrode block and a corresponding sensing line are electrically connected.]

*11. A display device, comprising:*

*a plurality of gate lines and a plurality of data lines crossing the gate lines on a substrate of a display panel;*

*a plurality of sensing electrodes over the substrate and configured to sense a touch, the sensing electrodes including a first sensing electrode;*

*a plurality of sensing lines over the substrate and including a first sensing line electrically connected to the first sensing electrode, wherein the first sensing line is insulated from the other sensing electrodes in an area of the display panel overlapping with the other sensing electrodes in a plan view, the first sensing line having a first pad part; and*

*a first contact part electrically connected between the first pad part and the first sensing electrode to electrically connect the first sensing line to the first sensing electrode,*

*wherein the first contact part contacts the first pad part.*

*12. The display device of claim 11, wherein the first sensing line includes a plurality of pad parts, including the first pad part, the pad parts being wider than other parts of the first sensing line.*

*13. The display device of claim 12, wherein each of the pad parts has a same width irrespective of whether the respective pad part contacts the first contact part.*

*14. The display device of claim 12, further comprising a plurality of contact parts, including the first contact part,*

*wherein each of the contact parts contacts a corresponding one of the pad parts of the first sensing line to electrically connect the first sensing line to the first sensing electrode.*

*15. The display device of claim 14, wherein at least one of the pad parts of the first sensing line does not contact any of the contact parts.*

*16. The display device of claim 11, wherein the first contact part is connected directly between the first pad part and the first sensing electrode.*

*17. The display device of claim 11, wherein each of the sensing lines overlaps a corresponding one of the data lines or a corresponding one of the gate lines.*

*18. The display device of claim 11, wherein each of the sensing lines is disposed in a direction parallel to a corresponding one of the data lines or a direction parallel to a corresponding one of the gate lines.*

*19. The display device of claim 11, wherein the first contact part is disposed in a non-transmissive area of the display panel to prevent a reduction in an aperture ratio.*

*20. The display device of claim 11, further comprising a first protective layer,*

*wherein the first protective layer is on the first sensing electrode, and the first sensing line is on the first protective layer.*

*21. The display device of claim 11, further comprising a first protective layer,*

*wherein the first protective layer is on the first sensing line, and the first sensing electrode is on the first protective layer.*

*22. The display device of claim 11, wherein the first sensing line is formed of a material having a lower resistivity than a material of the first sensing electrode.*

*23. The display device of claim 11, further comprising a high-resistance conductive layer on the display panel,*

*wherein the high-resistance conductive layer includes a transparent material and is formed of a conductive material.*

*24. The display device of claim 11, further comprising a multiplexer and a sensing circuit,*

*wherein the multiplexer is coupled between the sensing lines and the sensing circuit.*

*25. The display device of claim 11, further comprising a sensing circuit configured to detect a signal from the first sensing electrode through the first sensing line to sense a touch.*

*26. The display device of claim 11, wherein the sensing lines include a second sensing line overlapping with the first sensing electrode and insulated from the first sensing electrode in an area of the display panel overlapping with the first sensing electrode in the plan view, and*

*wherein the sensing electrodes include a second sensing electrode, the second sensing electrode being electrically connected with the second sensing line.*

* * * * *